United States Patent [19]

Held

[11] 4,253,391
[45] Mar. 3, 1981

[54] RESILIENT SLIDE SURFACE SEAL FOR DOUBLE BELT PRESSES

[76] Inventor: Kurt Held, Alte Strasse 1, D-7218 Trossingen 2, Fed. Rep. of Germany

[21] Appl. No.: 123,357

[22] Filed: Feb. 21, 1980

[30] Foreign Application Priority Data

Feb. 23, 1979 [DE] Fed. Rep. of Germany ....... 2907086

[51] Int. Cl.³ .............................................. B30B 5/06
[52] U.S. Cl. ............................... 100/154; 100/93 RP; 156/555; 156/583.5; 308/3.5; 425/371
[58] Field of Search ..................... 156/555, 580, 583.5; 100/93 RP, 151, 154; 425/371; 308/DIG. 1, 3.5, 3.9

[56] References Cited

U.S. PATENT DOCUMENTS

| | | | |
|---|---|---|---|
| 2,135,763 | 11/1938 | Nicholson | 100/154 |
| 3,620,158 | 11/1971 | Torelli et al. | 100/154 |
| 3,808,092 | 4/1974 | Busker | 100/154 |
| 3,839,147 | 10/1974 | Daane | 100/154 |
| 4,193,342 | 3/1980 | Held | 100/154 |

*Primary Examiner*—Michael G. Wityshyn
*Attorney, Agent, or Firm*—Spencer & Kaye

[57] ABSTRACT

In a device forming a pressure cushion in a double belt press, the device including a pressure plate mounted in one support structure of the press, and a sealing member seated in a groove in the pressure plate to bear against the associated steel belt such that the sealing member, the steel belt and the surface of the plate surrounded by the groove together delimit a chamber arranged to contain a pressure medium to form the pressure cushion, the sealing member includes an elastically yieldable component extending around the entire path of the groove and arranged to be in sliding contact with the associated belt, and two wall components of rigid material each disposed along a respective lateral surface of the elastically yieldable component which extends transverse to the surface of the support plate and each located along at least one groove portion extending generally in the direction of belt advance, the pressure plate includes supporting elements defining at least part of the groove portions extending generally in the direction of belt advance and provided with a series of teeth projecting from the side thereof defining such part of the groove portions and spaced apart along the groove portions, and the sealing member has a toothed configuration along the sides thereof facing the supporting elements and formed to mesh with the teeth of the supporting elements for transmitting friction forces imposed on the sealing member by the associated belt to the pressure plate.

5 Claims, 7 Drawing Figures

RESILIENT SLIDE SURFACE SEAL FOR DOUBLE BELT PRESSES

BACKGROUND OF THE INVENTION

The present invention relates to seals for the pressure cushions of double belt presses.

Double belt presses are employed in material laminating and compression procedures in which a strip of material to be compressed is fed between two traveling metal belts which press against opposite surfaces of the material in order to compress it. Such presses are composed essentially of two metal belts each mounted on a respective support structure and between which a compression region is formed. The belts are advanced around their respective support structures so as to convey the material being worked upon through the press as that material is being pressed.

One known type of double belt press is constructed to operate according to the pressure cushion principle. For this purpose, the support structure associated with each belt is provided with a pressure plate located behind the belt in the compression region and provided with a slide surface seal forming a frame which encloses a pressure cushion formed by a liquid or gaseous pressure medium. The major faces of the cushion are bounded by the surface of the pressure plate and the rear surface of the associated metal belt, and the slide surface seal cooperates with the pressure plate and the rear belt surface in order to seal the region containing the pressure medium. The pressure medium acts against the rear surface of the associated metal belt to press it against the work material.

Slide surface seals for such structures must be designed in such a manner as to assure that friction forces occurring between the rear surface of the metal belt, which is generally of steel, and the seal are dependably directed into the associated pressure plate of the support structure of the machine without inducing changes in the shape of the seal. In addition, the heat developed as a result of friction should be transmitted to the associated pressure plate as completely as possible, i.e. without creating any significant temperature differential in the seal itself, and discharge of pressure medium from the cushion should be reliably prevented, except for passage of a minimum quantity to provide lubrication of the seal surfaces.

Known seals of this type, a typical example of which is disclosed in German Pat. No. 2,722,197, have been found to possess a number of drawbacks, among which are their high manufacturing cost and poor heat conductance characteristics, which result in accumulation of heat by the sealing material.

SUMMARY OF THE INVENTION

It is an object of the present invention to provide an improved slide surface seal structure which eliminates, or substantially reduces, the above-noted drawbacks.

This and other objects are achieved, according to the invention, in a device forming a pressure cushion in a double belt press operating according to the pressure cushion principle, the press being composed of two support members fixed relative to one another and two steel belts each supported by, and advancing around, a respective support member and arranged parallel to one another to define a material compression region, and the device including a pressure plate mounted in one support structure, to be coextensive with the compression region and located adjacent the side of the associated belt facing away from the compression region, the pressure plate being provided with a groove in the surface thereof facing the associated belt and extending in a closed path coextensive with at least part of the compression region and having portions extending generally in the direction of belt advance in the compression region, and a sealing member seated in the groove to bear against the associated steel belt such that the sealing member, the steel belt and the surface of the plate surrounded by the groove together delimit a chamber arranged to contain a pressure medium to form the pressure cushion by constituting the sealing member of an elastically yieldable component extending around the entire path of the groove and arranged to be in sliding contact with the associated belt, and two wall components of rigid material each disposed along a respective lateral surface of the elastically yieldable component which extends transverse to the surface of the support plate and each located along at least one groove portion extending generally in the direction of belt advance; by constituting the plate of supporting elements defining at least part of the groove portions extending generally in the direction of belt advance and provided with a series of teeth projecting from the side thereof defining such part of the groove portions and spaced apart along the groove portions; and by forming the sealing member to have a toothed configuration located along the sides thereof facing the supporting elements and formed to mesh with the teeth of the supporting elements for transmitting friction forces imposed on the sealing member by the associated belt to the pressure plate, whereby the elastically yieldable component acts to minimize leakage of pressure medium from the chamber and the wall components serve to define a gap of minimum size between the sealing member and the associated belt. Preferably, the elastically yieldable component is made of an elastomer or soft plastic material.

The elastic component of a sealing member according to the invention is preferably constituted by an elastomer or a soft plastic and acts to reduce the leakage flow rate to a minimum. On the other hand, the rigid wall components, which are preferably of metal, are primarily responsible for transmitting friction forces imposed on the sealing member by the associated steel belt to the supporting plate. In addition, the wall components create a gap of minimum size with the steel belt to prevent extrusion of the elastic component therethrough.

When particular operating conditions are to be encountered, it may be advantageous to provide, in a known manner, those surfaces of the wall components which contact the groove sides with sliding friction reducing coatings, e.g. of fluoridized hydrocarbons, or it may prove necessary to utilize, as the elastic component, a soft, i.e. easily yieldable, plastic material, for example also made of a fluoridated hydrocarbon, and to strengthen the elastic component against shearing forces by addition of a metal web which is welded into one or both wall components.

BRIEF DESCRIPTION OF THE DRAWINGS

FIG. 1a is a side elevational view, partly in cross section, of the basic components of a double belt press arranged to operate according to the pressure cushion principle and to be equipped with slide seals according to the invention, components 1 thereof being shown in cross section along line C–D of FIG. 2a.

FIG. 1b is a cross-sectional, detail view taken along line A–B of FIG. 1a.

FIG. 2b is a detail, plan view, to an enlarged scale, of the region 20 of FIG. 2a.

FIG. 3a is a detail, plan view, to an enlarged scale, of the region 21 of FIG. 2a.

FIG. 3b is a cross-sectional view taken along the line G–H of the FIG. 3a.

DESCRIPTION OF THE PREFERRED EMBODIMENTS

Figure 1A:
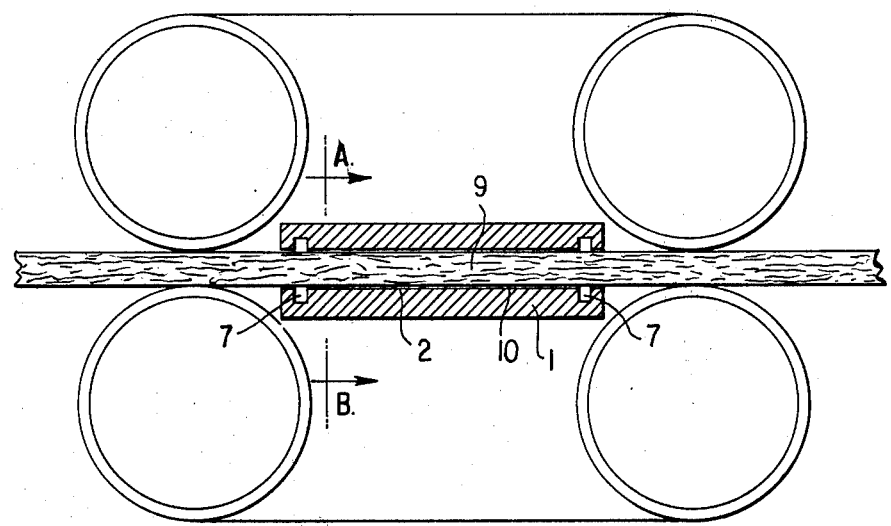
Figure 1B:
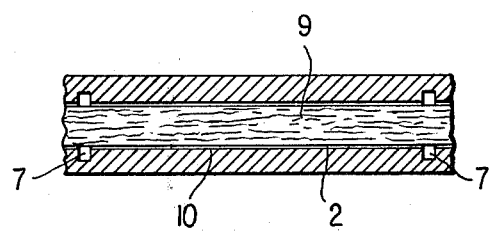

FIG. 1a shows the basic arrangement of a double belt press constructed to operate according to the pressure cushion principle. This press includes upper and lower support structures each including two rollers around which travel a respective one of the steel belts 2. In the area where the two belts travel adjacent, and facing, one another, there is defined a compression region for compressing material 9 to be worked upon. Adjacent this region, each support structure carries a respective pressure plate 1. Each pressure plate 1 is provided, at the surface thereof facing its associated belt 2, and as is best seen in FIG. 2a, with a groove 7 extending along an essentially closed path having the form of a generally rectangular frame the long sides of which extend in the direction of belt advance.

The groove 7 in each pressure plate is provided to receive a sealing member, to be described in detail below, which will extend between its associated pressure plate 1 and belt 2 in order to define, together with the surfaces of plate 1 and belt 2 enclosed thereby, a chamber arranged to receive a fluid medium under pressure in order to create a pressure cushion 10 producing forces for compressing work material 9 entrained between belts 2.

Figure 2A:
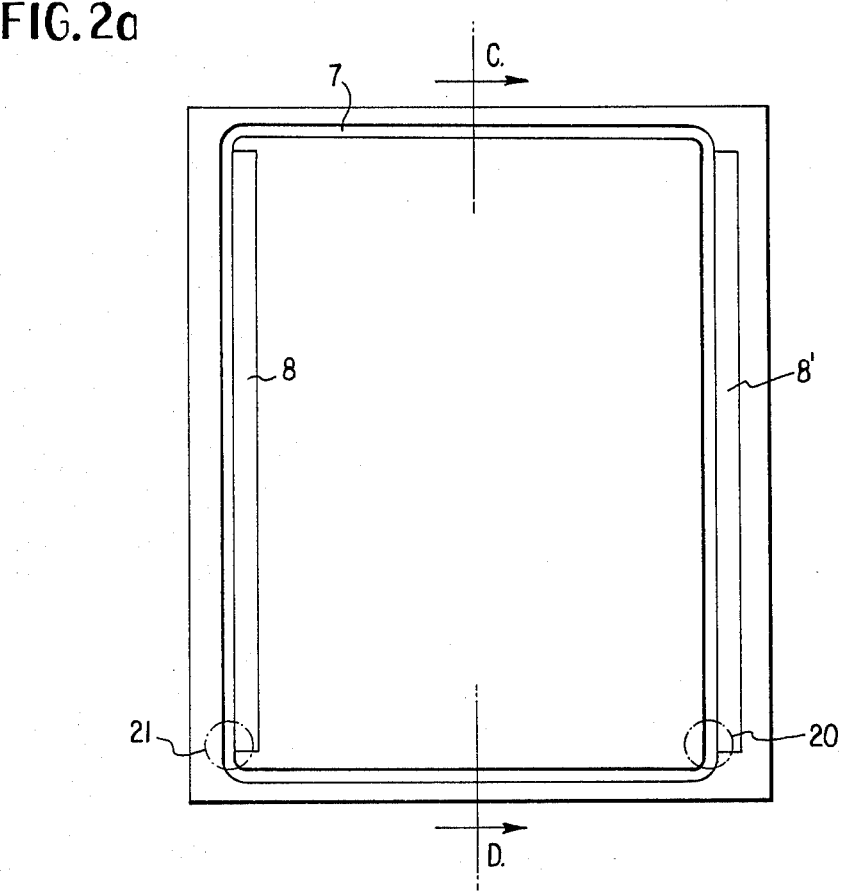
FIG. 2a is a plan view of one of the components 1 of FIG. 1a, looking toward the surface carrying the slide seal and drawn to a larger scale.

Referring in greater detail to FIG. 2a, each pressure plate 1 includes two strips 8, 8' each located along a portion of groove 7 which extends in the direction of belt advance defining one lateral side of its associated groove portion. Strip 8 is located at the pressure cushion side of groove 7, while strip 8' is located outside of the pressure cushion.

Figure 2B:
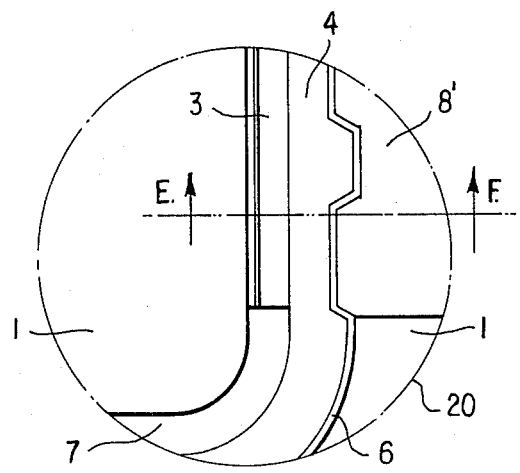
Figure 3A:
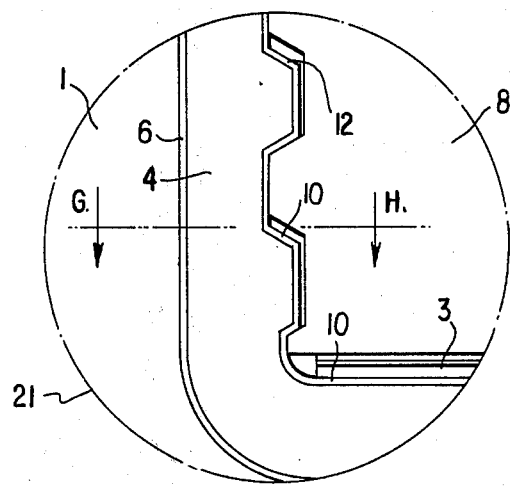

As is best seen in FIGS. 2b and 3a, each of strips 8 and 8' is formed, along the edge thereof which defines one lateral side of groove 7, to have a toothed structure the teeth of which have a generally trapezoidal form and are spaced apart along the length of the associated groove portion. The teeth are thus separated by valleys whose sides slope away from one another toward the crests of adjacent teeth. The opposite lateral sides of these groove portions are linear and the teeth in strips 8 and 8' are formed to have a low peak-to-valley height relative to the overall width of the groove.

In order to facilitate fabrication, strips 8 and 8' are separate pieces which, after fabrication, are secured to the pressure plate 1. It would be conceivable, however, for those strips to be integral with the pressure plate.

Figure 3B:
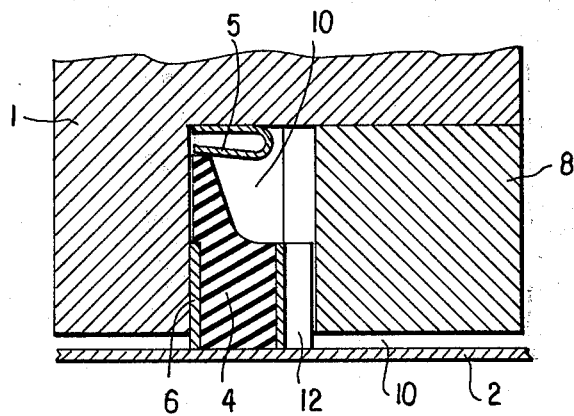
Figure 4:
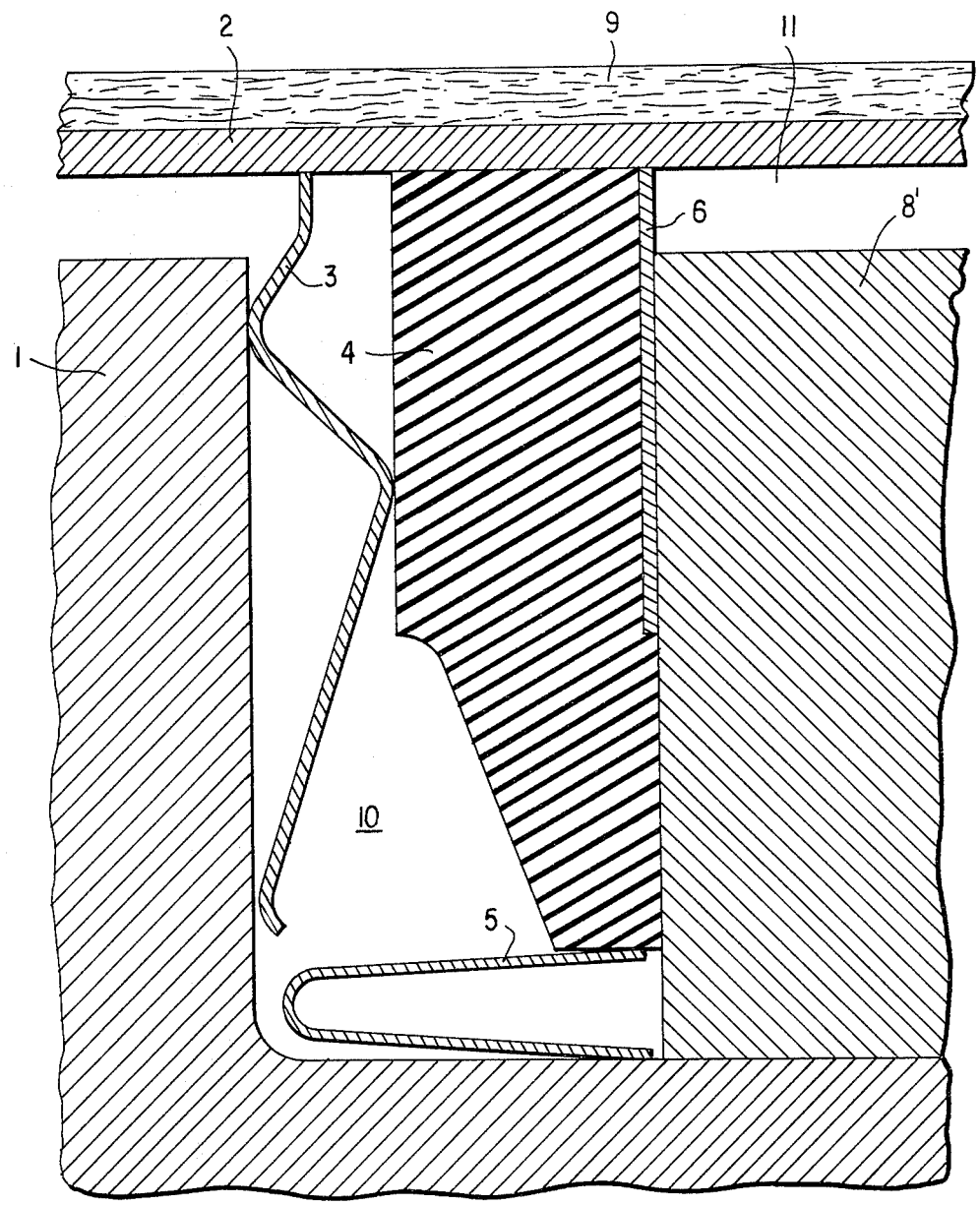
FIG. 4 is a cross-sectional view, to an enlarged scale, taken along line E–F of FIG. 2b.

As shown in FIGS. 2b, 3 and 4, the sealing member according to the present invention is composed of an elastically yieldable component 4, which is preferably an elastomer or soft plastic material, and rigid, preferably metal, supporting wall components 6 and 12. Wall component 6 is located adjacent the side of component 4 which is remote from pressure cushion 10 and extends around the entire periphery of the sealing member. Wall component 12, which serves as a holding wall, on the other hand, is located along the pressure cushion side of component 4 and can either extend around the entire periphery of the pressure cushion or can extend only part way therearound, in which case it would be coextensive at least with toothed strip 8.

In the regions of strips 8 and 8', wall components 12 and 6, respectively, are formed to present a tooth shaped configuration dimensioned to mate with the teeth formed in the respective tooth strips. Elastic component 4 can be preformed to have a corresponding configuration, or can be made to assume such configuration when fitted together with wall components 6 and 12 and inserted into groove 7.

The sealing assembly is completed by a folded spreader spring 5 seated in the base of groove 7, extending around the entire periphery thereof, and acting to press the sealing member against the associated steel belt 2, and a lateral pressure spring 3 located at the pressure cushion side of the sealing member and exerting a force tending to press the sealing member in the direction away from the pressure cushion. For reasons to be explained below, spring 3 need not be provided in the region where groove 7 is partially delimited by toothed strip 8.

As can be seen in FIGS. 3b and 4, pressure medium can enter the groove 7 along the side of the sealing member directed toward the pressure cushion and the elastic component 4 is given a configuration such that the pressure medium will produce a force urging the sealing member against the associated steel belt 2. The pressure medium additionally produces forces urging the sealing member outwardly of the pressure cushion and, therefore, against the toothed surface of strip 8'.

Supporting wall components 6 and 12 will be manufactured in dependence on the specific machine with which they are to be used and serve to assure that no gap will be created between the sealing member and the metal belt, even after some wear has occurred after a certain period of operation, through which material could be extruded from the elastically yieldable component 4. Components 6 and 12 will thus prevent destruction of the elastically yieldable component.

The friction forces imposed on the components 4, 6 and 12 by the associated steel belt along the sides of the sealing member which extend in the direction of belt travel will be conducted from the sealing member, and in particular from the wall component associated with the toothed strip, into that toothed strip. Transmission into the toothed strip occurs primarily at the tooth flanks against which the associated wall component is forced by the friction force, as is best illustrated in FIG. 3a with respect to toothed strip 8 and the associated portion of wall component 12. In view of the location of toothed strip 8 and the inclination of the tooth flanks against which wall component is pressed, the friction forces will produce a component urging the sealing member along that side of the pressure cushion outwardly away from the pressure cushion. As a result, it is not necessary to provide the lateral pressure spring along that portion of the sealing member.

As is also depicted in FIG. 3a, the effect of the action of the advancing belt on the sealing member along each side thereof which extends in the direction of belt advance is such as to create spaces between the teeth of each toothed strip and those of the associated wall component. In the case of toothed strip 8, these spaces are in communication with the pressure cushion so that pressure fluid enters those spaces, where it acts to press the sealing member outwardly. The pressure cushion also acts on the sealing member around the remainder of its periphery to urge the sealing member outwardly.

Since the elastically yieldable material of component 4, particularly when it is an elastomer, presents an exceptionally high resistance to wear as a result of friction forces, it is the component 4 which is primarily responsible for maintaining contact pressure against the associated steel belt. The wall components 6 and 12, on the other hand, will experience a higher degree of wear, particularly when a new sealing member is placed into use, and after an initial wear-in period it will be component 4 which, as noted above, supports the bearing forces urging the sealing member against the associated steel belt. Thus, elastically yieldable component 4 is primarily responsible for sealing the interface between the sealing member and the steel belt, while wall components 6 and 12 maintain a small gap with that belt to prevent extrusion, under the influence of bearing and friction forces, of material from component 4.

While the drawings illustrate an embodiment of the invention in which one toothed strip is located within the region enclosed by the sealing member and the other toothed strip is located outside of that region, advantageous embodiments could be constructed in which both toothed strips are located within that region or outside thereof. In the one case, the pressure plate would be provided with two toothed strips 8 each located within the pressure cushion region and the sealing member would be provided with a wall component 12 located along at least each side of the pressure cushion which extends in the direction of belt advance. In the other case, the pressure plate would be provided with two strips 8' each located outside of the pressure cushion region and wall component 6 would be given a corresponding toothed configuration along each side of the pressure cushion extending in the direction of belt advance.

According to another advantageous embodiment of the invention, a pair of toothed strips identical in structure to strips 8 and 8' could be associated with one or each groove portion extending in the direction of belt advance. In this case, each of wall components 6 and 12 associated with that portion of the groove would be given an appropriate toothed configuration and would each mate with the teeth in a respective toothed strip.

It will be understood that the above description of the present invention is susceptible to various modifications, changes and adaptations, and the same are intended to be comprehended within the meaning and range of equivalents of the appended claims.

What is claimed is:

1. In a device forming a pressure cushion in a double belt press operating according to the pressure cushion principle, the press being composed of two support structures fixed relative to one another and two steel belts each supported by, and advancing around, a respective support structure and arranged parallel to one another to define a material compression region, and the device including a pressure plate mounted in one support structure, to be coextensive with the compression region and located adjacent the side of the associated belt facing away from the compression region, the pressure plate being provided with a groove in the surface thereof facing the associated belt and extending in a closed path coextensive with at least part of the compression region and having portions extending generally in the direction of belt advance in the compression region, and a sealing member seated in the groove to bear against the associated steel belt such that the sealing member, the steel belt and the surface of the plate surrounded by the groove together delimit a chamber arranged to contain a pressure medium to form the pressure cushion, the improvement wherein: said sealing member comprises an elastically yieldable component extending around the entire path of said groove and arranged to be in sliding contact with the associated belt, and two wall components of rigid material each disposed along a respective lateral surface of said elastically yieldable component which extends transverse to said surface of said support plate and each located along at least one groove portion extending generally in the direction of belt advance; said pressure plate comprises supporting elements defining at least part of said groove portions extending generally in the direction of belt advance and provided with a series of teeth projecting from the side thereof defining such part of said groove portions and spaced apart along said groove portions; and said sealing member is formed to have a toothed configuration located along the sides thereof facing said supporting elements and formed to mesh with said teeth of said supporting elements for transmitting friction forces imposed on said sealing member by the associated belt to said pressure plate; whereby said elastically yieldable component acts to minimize leakage of pressure medium from said chamber and said wall components serve to define a gap of minimum size between said sealing member and the associated belt.

2. An arrangement as defined in claim 1 wherein said elastically yieldable component is constituted by an elastomer or soft plastic material.

3. An arrangement as defined in claim 1 or 2 wherein said supporting elements are all disposed at the pressure cushion side of said groove.

4. An arrangement as defined in claim 1 or 2 wherein said supporting elements are all disposed at the side of said groove remote from the pressure cushion.

5. An arrangement as defined in claim 1 or 2 wherein, along at least one portion of said groove extending in the direction of belt advance, respective ones of said supporting elements provided with teeth are disposed along, and define respective sides of, said groove portion.

* * * * *